(12) United States Patent
Haupt et al.

(10) Patent No.: US 10,017,043 B2
(45) Date of Patent: Jul. 10, 2018

(54) ELECTRIC DRIVE

(71) Applicant: GKN Automotive Ltd., Redditch, Worcestershire (GB)

(72) Inventors: Jan Haupt, Kürten (DE); Marc Absenger, Wuppertal (DE); Jochen Manger, Bonn (DE); Manuel Aprath, Sinzig (DE); Colin Zaers, Königswinter (DE); Oliver Bartz, Voerde (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 15/522,784

(22) PCT Filed: Oct. 31, 2014

(86) PCT No.: PCT/EP2014/073439
§ 371 (c)(1),
(2) Date: Apr. 28, 2017

(87) PCT Pub. No.: WO2016/066215
PCT Pub. Date: May 6, 2016

(65) Prior Publication Data
US 2017/0361697 A1    Dec. 21, 2017

(51) Int. Cl.
*H02K 5/16*    (2006.01)
*B60K 6/405*    (2007.10)
(Continued)

(52) U.S. Cl.
CPC ............... *B60K 6/405* (2013.01); *B60K 6/36* (2013.01); *B60K 6/387* (2013.01); *B60K 6/52* (2013.01); *B60K 6/54* (2013.01)

(58) Field of Classification Search
CPC ......................................... H02K 5/16–5/1737
See application file for complete search history.

(56) References Cited

U.S. PATENT DOCUMENTS 4,429,924 A * 2/1984 Franz .................. H02K 5/1732
                                                                        123/196 R
5,381,066 A * 1/1995 Miyaji .................. F16C 33/765
                                                                        310/90
(Continued)

FOREIGN PATENT DOCUMENTS

DE            44 10 074 A1    9/1995
DE    10 2010 043 816 A1    5/2012
(Continued)

OTHER PUBLICATIONS

International Search Report and Written Opinion for PCT/EP2014/073439 dated Jul. 13, 2015 (with English translation; 15 pages).

*Primary Examiner* — Erez Gurari
(74) *Attorney, Agent, or Firm* — Bejin Bieneman PLC

(57) ABSTRACT

An electric drive for driving a motor vehicle comprises a housing assembly; an electric motor having a motor shaft provided in the form of a hollow shaft which is rotatingly drivable around a rotational axis A and which is connected to a drive gear; a transmission unit having at least one transmission shaft which is rotatingly drivable by the drive gear and having at least one output shaft, the output shaft extending through the hollow shaft; wherein between the hollow shaft and the output shaft an annular channel is formed, having a first opening facing the transmission unit and a second opening facing away from the transmission unit; wherein the housing assembly comprises a lubricant-guiding geometry that is configured to guide lubricant into a mouth region of the first opening of the annular channel, so that the lubricant can flow through the annular channel to the second opening.

14 Claims, 2 Drawing Sheets

Figure 1:
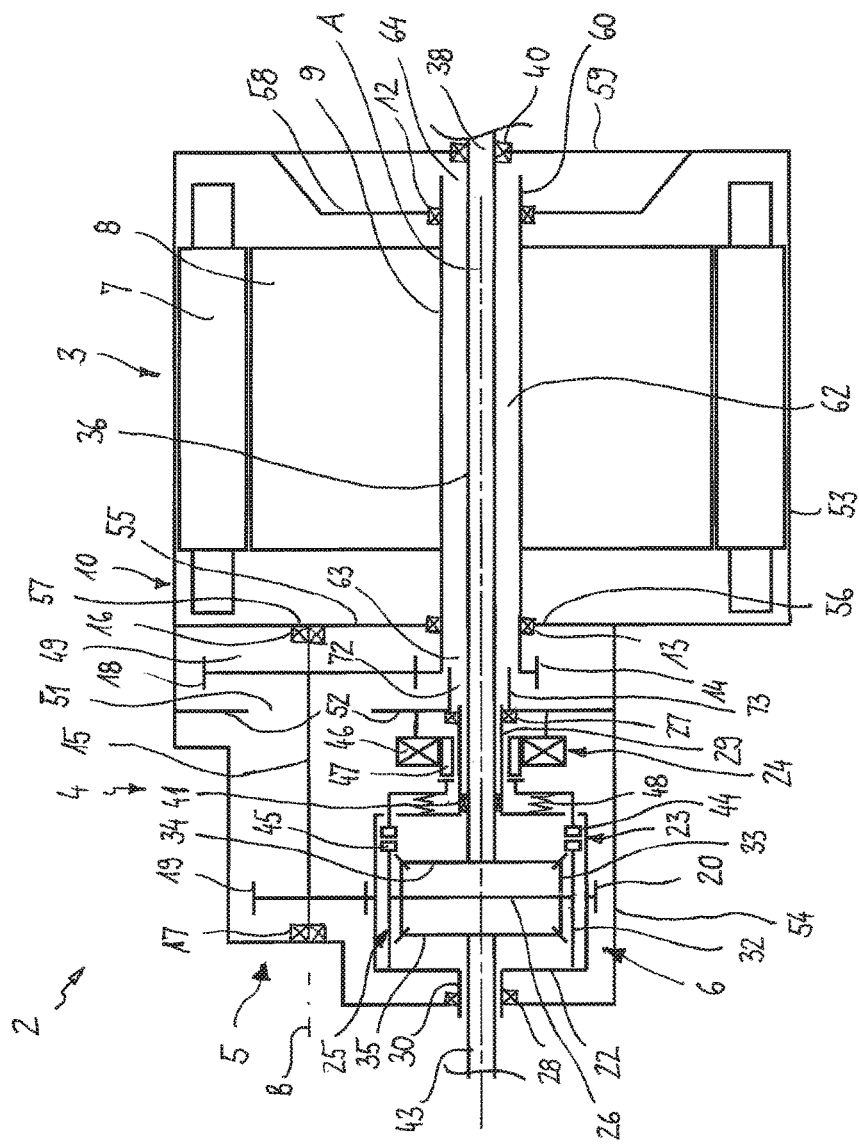

(51) Int. Cl.
*B60K 6/54* (2007.10)
*B60K 6/36* (2007.10)
*B60K 6/387* (2007.10)
*B60K 6/52* (2007.10)

(56) References Cited

U.S. PATENT DOCUMENTS

| | | | | |
|---|---|---|---|---|
| 5,443,130 A | * | 8/1995 | Tanaka | B60K 1/00 180/65.6 |
| 5,650,674 A | * | 7/1997 | Hayashi | G02B 26/121 310/51 |
| 5,714,817 A | * | 2/1998 | Norris | F16C 33/80 277/412 |
| 5,838,085 A | * | 11/1998 | Roesel, Jr. | F02N 11/04 310/112 |
| 5,969,446 A | * | 10/1999 | Eisenhaure | F16F 15/1428 310/51 |
| 7,594,757 B2 | * | 9/2009 | Verhaegen | F16C 33/6651 184/104.3 |
| 8,336,652 B2 | * | 12/2012 | Suzuki | B60K 7/0007 180/65.51 |
| 8,579,512 B2 | * | 11/2013 | Radinger | F16C 33/78 384/473 |
| 8,678,115 B2 | * | 3/2014 | Kasuya | B60K 1/00 180/65.1 |
| 8,997,956 B2 | * | 4/2015 | Iwase | B60K 6/26 192/3.26 |
| 9,140,311 B2 | * | 9/2015 | Iwase | F16D 25/0638 |
| 9,175,759 B2 | * | 11/2015 | Iwase | F16H 45/00 |
| 9,701,204 B2 | * | 7/2017 | Suzuki | B60L 3/0061 |
| 2008/0128208 A1 | * | 6/2008 | Ideshio | B60K 6/52 184/6 |
| 2009/0127954 A1 | * | 5/2009 | Mogi | B60K 17/12 310/90 |
| 2010/0109461 A1 | * | 5/2010 | Kato | B60K 6/26 310/90 |
| 2010/0320849 A1 | * | 12/2010 | Wilton | B60K 1/00 310/52 |
| 2011/0011203 A1 | * | 1/2011 | Yamamoto | B60K 7/0007 74/606 A |
| 2011/0121692 A1 | * | 5/2011 | Iwase | B60K 6/40 310/67 R |
| 2011/0240430 A1 | * | 10/2011 | Iwase | B60K 6/26 192/3.29 |
| 2012/0217830 A1 | * | 8/2012 | Iwase | B60K 6/26 310/78 |
| 2013/0009522 A1 | * | 1/2013 | Ozaki | H02K 7/116 310/67 R |
| 2013/0057117 A1 | * | 3/2013 | Suzuki | B60K 7/0007 310/60 R |
| 2017/0361697 A1 | * | 12/2017 | Haupt | B60K 6/405 |

FOREIGN PATENT DOCUMENTS

DE 10 2012 205 757 B4 8/2014
EP 0587389 A1 3/1994

* cited by examiner

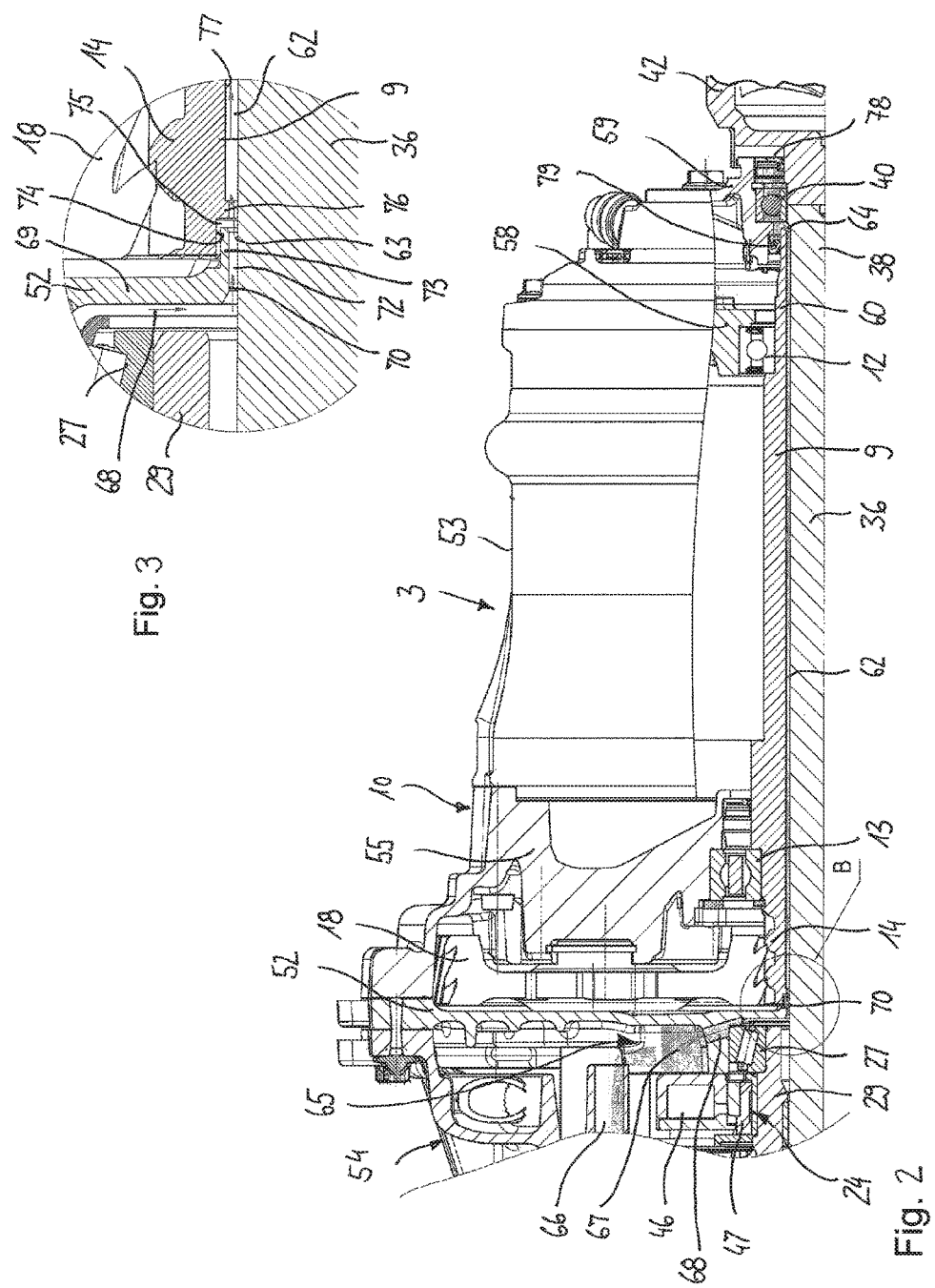

ELECTRIC DRIVE

CROSS-REFERENCE TO RELATED APPLICATIONS

This application is a national stage of, and claims priority to, Patent Cooperation Treaty Application No. PCT/EP2014/073439, filed on Oct. 31, 2014, which application is hereby incorporated herein by reference in its entirety.

DESCRIPTION

Electric drives for optionally drivable secondary axles in hybrid four wheel drive vehicles can use disconnecting systems for disconnecting the electro motor from the wheels at higher vehicle speeds. This makes it possible to provide an advantageous design for the electric motor in respect of traction and, at higher vehicle speeds, reduces friction losses.

Supplying all the rotating parts of the electric drive with lubricant constitutes a challenge especially for those components which are arranged at a distance from an oil sump.

From US 2008/0128208 A1 an electric drive is known comprising an electric motor, a reduction gearing and a differential drive which divides the introduced torque to the two sideshafts. The electric drive is arranged coaxially relative to the differential drive. In the upper portion of the housing there is arranged a first catch tank which serves to lubricate the electric motor and part of the differential. A second catch tank is provided to temporarily store the lubricating oil centrifuged from the rotor of the electric motor to be supplied to bearings located at a distance.

DE 10 2012 205 757 B4 proposes a motor-transmission unit with an electric machine and a rotor shaft provided in the form of a hollow shaft. The rotor shaft comprises a bore which extends in the longitudinal direction and in which a helical pressure spring is arranged. The helical pressure spring rotates together with the rotating rotor shaft, thus forming a conveyor spiral for a cooling agent.

Disclosed herein is a drive assembly having an electric motor with drive parts running in a lubricant, which assembly ensures a reliable lubricant supply to rotating drive parts and thus a long service life.

The disclosure generally relates to an electric drive for driving a motor vehicle. An electric drive can serve as a single drive for a motor vehicle or it can be provided in addition to an internal combustion engine, wherein the electric drive and the internal combustion engine can drive the motor vehicle individually or together. Such drive concepts are also referred to as a "hybrid drive". Normally, an electric drive comprises an electric motor and a subsequent reduction gearing which translates an introduced rotational movement from a high speed to a low speed. The reduction gearing is drivingly connected to a subsequent differential drive which distributes the introduced torque to two sideshafts for driving the motor vehicle.

Accordingly, disclosed herein is an electric drive for driving a motor vehicle, comprising: a housing assembly; an electric motor having a motor shaft provided in the form of a hollow shaft, which is rotatingly drivable around a rotational axis and which is connected to a drive gear; a transmission unit having at least one transmission shaft which is rotatingly drivable by the drive gear and having at least one output shaft, wherein the output shaft extends through the hollow shaft; wherein between the hollow shaft and the output shaft an annular channel is formed, having a first opening facing the transmission unit and a second opening facing away from the transmission unit; wherein the housing assembly comprises a lubricant-guiding geometry which is configured to guide lubricant into a mouth region of the first opening of the annular channel, so that the lubricant can flow through the annular channel to the second opening.

An advantage of the electric drive is that the lubricant coming from the inside of the transmission unit can also reach regions of the electric drive which are remote from the transmission unit, to lubricate rotating parts such as bearings and or seals. It is possible to omit separate lubricant chambers or separate lubricant pumps, so that overall a simple design for the electric drive is achieved. The lubricant is to include, in particular, any free-flowing medium which is suitable to cool and/or lubricate rotating parts of the electric drive. For example, the lubricant can be oil. Said lubricant-guiding geometry can include any suitable means to guide lubricant in a targeted manner into the mouth region between the hollow shaft and the output shaft, so that it can flow into the annular channel.

According to an example, the housing assembly comprises an intermediate wall which comprises at last part of the lubricant geometry, wherein the intermediate wall, on its radial inside, comprises an annular portion with a through-aperture through which the output shaft is passed. The through-aperture is dimensioned such that an annular gap is formed between the intermediate wall and the output shaft, through which lubricant can flow out of the transmission unit towards the annular channel.

The intermediate wall can comprise a sleeve projection which extends coaxially relative to the rotational axis and in an axial direction, which sleeve projection engages a recess at an end face of the hollow shaft with an axial overlap. The sleeve projection and the hollow shaft overlap in the axial direction, thereby forming a small gap. As a result of the axial overlap between the sleeve projection and the end-sided recess of the hollow shaft, there is formed a labyrinth seal. The labyrinth seal pre-vents any lubricant flowing towards the annular channel from escaping radially outwardly through the gap formed between the fixed sleeve projection and the rotating hollow shaft prior to reaching the annular channel. To that extent, the labyrinth seal has a throttling effect on lubricant in the gap between the sleeve projection and the hollow shaft, so that the supply of lubricant to the first opening of the annular channel is particularly supported. It is proposed in particular that the sleeve projection of the intermediate wall comprises an outer diameter which is smaller than an inner diameter of the recess at the end face of the hollow shaft. Furthermore, it possible that between an end face of the sleeve projection and a radial face of the recess there is formed a radial gap. Further, there could be a friction bearing between the hollow shaft and the sleeve projection.

To ensure a reliable supply of lubricant through the annular channel, the hollow shaft can comprise a radially inwardly projecting collar at an end portion facing the transmission unit. The collar is preferably axially spaced from the end face of the hollow shaft and can form a side face axially delimiting the end-sided recess. The axial depth of the recess, and the axial distance of the collar from the end face can, for example, be at least 2 millimeters (mm), more particularly at least three millimeters and/or at most of 10 millimeters. The collar comprises an inner diameter which is smaller than the inner diameter of the recess, respectively smaller than the inner diameter of the portion of the hollow shaft, which portion extends from the collar towards the second opening. The radial gap between the cylindrical inner face of the collar and the cylindrical outer face of the output shaft can be greater than 0.5 mm and/or smaller than 1.5 mm, for example. The same can apply for the annular gap formed between the sleeve projection and the output shaft. The annular channel formed between the output shaft and the hollow shaft can comprise a radial extension of greater than 1.0 mm and/or smaller than 2.0 mm for example. It is understood that said sizes are given by way of example only and can be modified accordingly, depending on the lubricant requirements and the length of the hollow shaft.

According to an example, the transmission unit comprises a reduction gearing and a differential drive, wherein the reduction gearing comprises a transmission shaft and is configured for gearing down a torque introduced by the drive gear to lower speeds, and wherein the differential drive comprises an input part which is rotatingly drivable by the transmission shaft and a plurality of output parts which are drivable by the input part so as to rotate around the rotational axis, wherein the at least one output shaft comprises a first end which is connected to one of the output parts of the differential drive in a rotationally fixed way to transmit torque. The reduction gearing is configured for transmission into slower speeds. Thus the input part of the differential drive rotates much slower than the motor shaft of the electric motor. The differential drive divides the introduced torque amongst two output parts which are provided in the form of sideshaft gears. The sideshaft gears serve to drive an associated side shaft, respectively a wheel of the motor vehicle connected thereto. The output shaft passed through the hollow shaft is connected to a first sideshaft gear of the differential drive in a rotationally fixed way and drives a first sideshaft. The opposed second sideshaft gear serves to drive a second sideshaft.

The housing assembly of the electric drive can be provided as a multi-component assembly including individual housing parts that can be connected to one another by flange connections for example. On one side facing away from the electric motor, respectively facing the differential drive, the intermediate wall of the housing assembly can comprise a chamber which is configured to temporarily receive lubricant that is sprayed by the rotation of rotating parts of the transmission unit. More particularly, it is proposed that the intermediate wall comprises at least one through-channel which, with a radially outwardly positioned end, ends in the chamber, and through which channel lubricant can flow from the chamber to the through-aperture of the intermediate wall into the region of the first opening. The chamber thus forms a reservoir for lubricant which then, slowly but surely, can flow to the first opening and into the annular channel, respectively. Furthermore, the housing assembly can comprise a lubricant collecting portion which is configured to gather lubricant spray and guide same into the chamber. The lubricant collecting portion can be arranged in an axial region of overlap with the drive gear for the differential drive to collect as large an amount of lubricant as possible.

According to an example, the power path can comprise a clutch between the electric motor and the at least one output shaft, which clutch is designed to selectively effect or interrupt a transmission of torque. In concrete terms, the clutch can be arranged in the power path between the reduction gearing and the differential carrier, with other possibilities not being excluded. The clutch is operated by a controllable actuator and the actuator can comprise an electro-magnet. The electro-magnet can be connected to the intermediate wall of the housing assembly such that a portion of the magnet housing and a portion of the intermediate wall form the lubricant chamber.

The output shaft passing through the hollow shaft comprises a second end portion remote from the transmission unit, which second end portion is supported by a shaft bearing in a bearing-receiving part of the housing assembly so as to be rotatable around the rotational axis. The hollow shaft extends axially preferably as far as and into the bearing-receiving part, i.e. an end portion of the hollow shaft axially over-laps with the bearing-receiving part. The rotatably drivable hollow shaft is sealed relative to the stationary bearing-receiving part by a rotary seal which can be provided in the form of a radial shaft sealing ring. It is possible that the end face of the hollow shaft, i.e. the output mouth of the annular channel is positioned axially between the rotary seal and the shaft bearing for the output shaft, so that these components are well-lubricated. A further rotary seal laterally adjoins the shaft bearing and seals the annular chamber between the output shaft and the bearing-receiving part.

According to an example, the housing assembly can comprise a central cover part which is received between a first housing portion accommodating the electric motor and a second housing portion accommodating the reduction gearing and the differential drive. The cover part can comprise a bearing-receiving portion in which the hollow shaft is rotatably supported. In particular, it is possible that the hollow shaft comprises a shaft portion which is connected to the rotor of the electric motor in a rotationally fixed way, a bearing portion rotatably supported in the bearing-receiving portion and the drive gear, wherein the drive gear is produced so as to be integral with the hollow shaft and to project freely into a chamber formed between the cover part and the immediate wall.

An example is explained below with reference to the drawings, wherein:

FIG. 1 schematically shows an example electric drive in a longitudinal section;

FIG. 2 shows an enlarged detail of the electric drive according to FIG. 1, illustrating the supply of lubricant to outside parts; and FIG. 3 shows the mouth region of FIG. 2 in the form of an enlarged detail.

FIGS. 1 to 3 will be described jointly below. FIG. 1 is a schematic illustration of an example electric drive 2 having an electric motor 3 and a transmission unit 4 rotatingly drivable by the electric motor. The transmission unit 4 comprises a reduction gearing 5 and differential drive 6 arranged downstream in the power path, but without being limited thereto. The electric drive 2 can be used as the only driving source or it can be used together with an additional driving source for driving the motor vehicle.

The electric motor 3 comprises a stator 7 and a rotor 8 which is rotatable relative to the stator 7 and which, when the electric motor is supplied with current, rotatingly drives the motor shaft 9. The rotational movement of the motor shaft 9 is transmitted to the differential drive 6 via the reduction gearing 5 which follows in the power path. The electric motor 3 is supplied with electric current by a battery (not shown), wherein the battery can also be charged by the electric motor when operated in generator mode. Furthermore, the electric drive 2 comprises a housing assembly 10 in which the electric motor 3 and the transmission unit 4 are arranged.

The reduction gearing 5 is configured so that the rotational movement introduced by the motor shaft 9 is reduced from high speed to a low speed, which is why the gearing is referred to as a reduction gearing. The motor shaft 9 is provided in the form of a hollow shaft and is supported by bearings 12, 13 in the housing assembly 10 of the electric drive 2 so as to be rotatable around a rotational axis A. A drive gear 14 (first gear) is rotationally fixed to the driveshaft 9, more particularly it is produced so as to be integral therewith.

The reduction gearing 5 comprises a transmission shaft 15 which, via bearings 16, 17, is rotatably supported in the housing assembly 10 around a second rotational axis B which extends parallel to the first rotational axis A, and which can also be referred to as an intermediate shaft. The transmission shaft 15 comprises a drive gear 18 (second gear) and an output gear 19 (third gear) which are connected to the transmission shaft in a rotationally fixed way and, more particularly, are produced so as to be integral therewith. The output gear 19 engages the annular gear 20 (fourth gear) for driving the differential drive 6.

The drive gear 14 of the motor shaft 9 and the engaging drive gear 19 of the transmission shaft 15 form a first pair of gears of the reduction gearing 5, said first pair having a first transmission ratio i1. The output gear 19 of the transmission shaft 15 and the engaging annular gear 20 form a second pair of gears i2. It can be seen that the motor shaft drive gear 14 comprises a much smaller diameter and a smaller number of teeth than the transmission shaft drive gear 18. In this way, a slowing a transmission is achieved. Also, the driveshift output gear 19 comprises a smaller diameter and a smaller number of teeth, respectively than the annular gear 20, thus achieving a further reduction in speed.

The differential drive 6 comprises a differential housing 22 that is firmly connected to the annular gear 20 and that is rotatingly drivable by the output gear 19 around the rotational axis A; the drive 6 also comprises a differential unit 25 which is received in the differential housing 22. In the power path between the differential housing 22 and the differential unit 25 there is provided a controllable clutch 23 which is controllable by an actuator 24. The differential housing 22 is supported by bearings 27, 28 so as to be rotatable around the rotational axis A in the stationary housing 10. The differential housing 22 can be provided in two parts, comprising a first housing part which is produced so as to be integral with the annular gear 20 and a second housing part, which two housing parts are firmly connected to one another. The two housing parts each comprise a sleeve projection 29,30, via which they are rotatably accommodated in the respective bearings 27, 28. The differential unit 25 is arranged coaxially to the rotational axis A in the differential housing 22.

The differential unit 25 comprises a differential carrier 32 as an input part which is rotatably supported relative to the differential housing 25, a plurality of differential gears 33 which are connected to the differential carrier 32 and which are rotatably supported on the journal 26 connected to the differential carrier 32, as well as a first and a second sideshaft gear 34, 35 as output parts which are rotatingly drivable by the differential gears 33 around the rotational axis A. The first sideshaft gear 34 is rotationally fixed to an output shaft 36 which is arranged coaxially relative to the rotational axis A, which output shaft extends through the motor shaft 9 provided as hollow shaft. The output shaft 36 comprises an end portion 37 at the gearing side which is rotatably supported by a bearing 41 in the transmission housing, as well as an end portion 38 remote from the gearing which is rotatably supported by a bearing 40 in the housing assembly 10 around the rotational axis A. At the outer end portion 38 the outer joint part 42 of a constant velocity joint can be seen, which outer joint part 42 serves to transmit torque to a first sideshaft (not shown) of a motor vehicle under an angular movement. The second sideshaft gear 35 is rotationally fixed to the shaft journal 43 which transmits the introduced torque via a constant velocity joint to a second sideshaft (not shown).

The clutch 23 is provided in the form of a form-locking clutch, with the use of other clutch types also being possible which are suitable to selectively effect or interrupt a transmission of torque in the power path between the electric motor 3 and the sideshafts of the motor vehicle. The clutch 23 comprises a first clutch part 44 which is connected to the differential housing 22 so as to be rotationally fixed and axially movable, as well as a second clutch part 45 which is firmly connected to the differential carrier 32; more particularly, it is produced so as to be integral therewith. For transmitting torque, the first clutch part 44 can be engaged with the second clutch part 45, with a form-locking connection being effected between the two clutch parts. The transmission of torque can be interrupted again by disengaging the two clutch parts. The second clutch part 45 comprises a toothed ring which constitutes a form-locking element and which is integrally formed at an end face of the differential carrier 32. Accordingly, the first clutch part 44 comprises a corresponding toothed ring which is arranged inside the differential housing 22. Furthermore, the first clutch part 44 comprises a plurality of circumferentially distributed axial projections which pass through corresponding through-openings of the differential housing 22. The electro-magnetic actuator 24, when operated, acts on the axial projections of the first clutch part 44 to axially move same. Upon actuation of the actuator, the first clutch part 44 is engaged so that a transmission of torque from the drive gear 20 to the differential unit 25 is interrupted. In the non-operated condition, the clutch part 44 is loaded by spring means 48 into the disengaged state. A target element which cooperates with a sensor (not shown) can be fixed to the axial projections of the clutch part 44, so that the position of the clutch can be determined.

The actuator 24 comprises an electro-magnet 46 as a well as a piston 47 which, when the electro-magnet 46 is energised, is loaded towards the clutch 23. The electro-magnet 46 comprises an annular housing which is connected to an intermediate wall 52 of the housing assembly 10.

It can be seen in FIG. 1 that the housing assembly 10 includes a plurality of individual housing parts. More particularly, the housing assembly 10 comprises a first housing portion 53 which receives the electric motor 3, and a second housing portion 54 which receives the transmission unit 4, as well as a cover part 55 which is arranged between the first and the second housing portions 53, 54 and is firmly connected thereto. The cover part 55 comprises a first bearing-receiving portion 56 in which the hollow shaft 9 is rotatably supported around the rotational axis A by the bearing 13, as well as a second bearing-receiving portion 57 in which the transmission shaft 15 is rotatably supported around the rotational axis B by a bearing 16. A receiving chamber 49 is arranged axially between the cover part 55 and the intermediate wall 52, in which receiving chamber the drive gears 14, 18 are received. The intermediate wall 52 comprises a bearing-receiving portion in which the bearing 27, for rotatably supporting the differential housing 22, is received, as well as a through-aperture 51 through which the transmission shaft 15 is passed. The through-aperture 51 comprises a greatest inner diameter which is greater than the outer diameter of the gear 19, so that the transmission shaft 15 plus the gear 19 can be mounted through the aperture 51.

At its end remote from the transmission unit 4, the housing assembly 10 comprises a further cover part 58 in which the bearing 12 for the hollow shaft 9 is received, and, connected thereto, a bearing-receiving part 59 in which the bearing 40 for the output shaft 36 is received. The hollow shaft 9 comprises a first end portion 60 which is rotatably supported in the housing part 58 by the shaft bearing 12, a shaft portion rotationally fixed to the rotor 8, a portion rotatably supported in the bearing-receiving portion 56 of the cover part 55, and the drive gear 14 which projects into the receiving chamber 49 formed between the cover part 55 and the intermediate wall 52.

As can be seen in particular in FIGS. 2 and 3, an annular channel 62 is formed between the hollow shaft 9 and the output shaft 36, which annular channel 62 comprises a first opening 63 facing the transmission unit 4 and a second opening 64 positioned remote from the transmission unit. The housing assembly 10 comprises a lubricant-guiding geometry 65 which is configured so as to guide lubricant from the transmission unit 4 into the mouth region of the first opening 63. The lubricant is thus able to flow through the aperture formed between the hollow shaft 9 and the output shaft 36 and along the annular channel 62 up to the second opening 64. In this way it becomes possible to supply even those parts of the drive assembly 3 with lubricant which are positioned away from the transmission unit 4.

In the second housing portion 54 a lubricant collecting portion 66 is formed in which lubricant sprayed inside the transmission unit 4 due to the rotation of rotating transmission parts is gathered and guided via a groove portion towards the intermediate wall 52. The lubricant collecting portion 66 is arranged in an axial region of overlap with the transmission shaft 15, respectively with the annular gear 20 of the differential drive 6, to collect as large an amount of lubricant as possible. On its side facing the differential drive 6, the intermediate wall 52 comprises a lubricant chamber 67 into which the lubricant can flow from the collecting portion 66 while temporally being accommodated therein. The chamber 67 is laterally delimited in the axial direction, i.e., on one side by a wall portion of the intermediate wall 52 and on the other side by a wall portion of the electro magnet 46. Radially inside, a through-channel 68 is provided which at one end, is connected to the chamber 67 and, at the other end, to a radially inner annular portion 69 of the intermediate wall 52. The direction of flow of the lubricant is indicated by arrows in FIGS. 2 and 3.

The intermediate wall 52 comprises a through-aperture 70 through which the output shaft 36 is passed. The inner diameter of the through-aperture 70 is greater than the outer diameter of the shaft 36 in this portion, so that between the shaft and the intermediate wall an annular aperture 72 is formed through which the lubricant can flow towards the hollow shaft 9 and the annular channel 62 respectively. It can be seen in particular in FIG. 3 that the intermediate wall 52, on its radial inside, comprises a sleeve projection 73 which extends in axial direction coaxially relative to the rotational axis A into a recess 74 in the end side of the hollow shaft 9. The sleeve projection 73 comprises an outer diameter which is smaller than an inner diameter of the end side recess 74. In the mounted condition, the sleeve projection 73 and the hollow shaft 9 overlap in the axial direction and between the two components there is formed an L-shaped gap in a half the longitudinal section. The gap 75 formed between the intermediate wall 52 and the hollow shaft 9 can have a width ranging between 0.1 and 0.5 millimeters for example. Because the sleeve projection 73 and the hollow shaft 9 axially engage, a labyrinth seal is formed, so that the stream of lubricant which flows through the gap between the sleeve projection 73 and the hollow shaft 9 is kept small. In this connection, the throttle effect created by the gap increases with an increasing length of the axial overlap between the sleeve projection 73 and the hollow shaft 9. For example, the axial overlap can range between 2.0 mm and 10 mm. Because of the axial overlap and the resulting fluidic throttle effect, a larger amount of lubricant passes through the gap 75 in the axial direction for reaching the annular gap 62 formed between the hollow shaft 9 and the output shaft 36 and from there to the remote components to be lubricated.

At its end portion facing the intermediate wall 52, the hollow shaft 9 comprises a radially inwardly projecting collar 76 which axially delimits the end face of the recess and the gap 75, respectively. The collar 76 comprises an inner diameter which is smaller than the inner diameter of the recess 74 and smaller than the inner diameter of the portion of the hollow shaft 9 which extends from the collar axially towards the second opening 64. Good lubricating conditions are provided in that the inner diameter of the collar 76 substantially corresponds to the inner diameter of the sleeve projection 73 and, in that the annular gap between the sleeve projection 73 and the shaft 9 is approximately equal to the annular gap between the collar 76 and the shaft 9. For example, said annular gaps can be greater than 0.5 mm, and/or smaller than 1.5 mm. The portion axially adjoining the collar 76 has a greater inner diameter than the inner diameter of the collar 76. The lubricant axially flowing past the collar 76 reaches a greater diameter within the annular channel 62 as a result of the centrifugal force. A lubricant column formed at the inner wall 77 of the hollow shaft can axially support itself on the collar 76, so that, as a result of new lubricant continuously flowing past the collar 76, there is produced a lubricant flow through the annular channel 62 as far as the remote end of the hollow shaft 9 where the lubricant leaves the opening 64 and reaches the bearing 40 and the shaft seal 78.

Overall, said electric drive 2 is advantageous in that lubricant coming from the region of the transmission unit 4 can reach even remotely positioned regions for the purpose of supplying lubricant to components which have to be lubricated.

The invention claimed is:

1. An electric drive for a motor vehicle, comprising:
a housing assembly;
an electric motor including a hollow motor shaft that is rotatingly drivable around a rotational axis and that is connected to a drive gear; and
a transmission unit including at least one transmission shaft that is rotatingly drivable by the drive gear and at least one output shaft, the output shaft extending through the hollow motor shaft, wherein an annular channel is formed between the hollow motor shaft and the output shaft, the annular channel including a first opening facing the transmission unit and a second opening facing away from the transmission unit;
wherein the housing assembly comprises an intermediate wall with a lubricant guiding geometry that is configured to guide lubricant into a mouth region of the first opening of the annular channel to allow lubricant to flow through the annular channel to the second opening;
wherein the intermediate wall, radially inside, comprises an annular portion with a through-aperture through which the output shaft is passed; and
wherein between the annular portion and the output shaft an annular gap is formed to allow lubricant to flow out of the transmission unit into the annular channel.

2. An electric drive according to claim 1, wherein the intermediate wall comprises a sleeve projection that extends coaxially relative to the rotational axis in an axial direction and that engages an end side recess of the hollow motor shaft with an axial overlap.

3. An electric drive according to claim 1, wherein the hollow motor shaft comprises a radially inwardly projecting collar at an end portion facing the transmission unit.

4. An electric drive according to claim 3, wherein the collar is axially spaced from an end face of the hollow motor shaft and axially delimits the recess.

5. An electric drive according to claim 3, wherein the collar comprises an inner diameter that is smaller than an inner diameter of the recess and smaller than an inner diameter of the portion of the hollow motor shaft that extends from the collar towards the second opening.

6. An electric drive according to claim 1, wherein:
the transmission unit comprises a reduction gearing and a differential drive,
the reduction gearing comprises the transmission shaft and is configured to transmit a torque introduced by the drive gear to provide a speed reduction,
the differential drive comprises an input part that is rotatingly drivable by the transmission shaft and a plurality of output gears that are drivable by the input part so as to rotate around the rotational axis, and
the at least one output shaft comprises a first end portion that is rotationally fixed to one of the output parts to transmit torque.

7. An electric drive according to claim 1, wherein the intermediate wall, on a side facing away from the electric motor, comprises a lubricant chamber to temporarily receive lubricant spray occurring upon rotation of rotating parts of the transmission unit.

8. An electric drive according to claim 7, wherein the intermediate wall comprises at least one through-channel that, with a radially outwardly positioned end, ends in the lubricant chamber and allows lubricant to flow therethrough from the lubricant chamber to the through-opening of the intermediate wall into the region of the first opening.

9. An electric drive according to claim 7, wherein the housing assembly comprises a lubricant collecting portion that is configured to accumulate lubricant spray and guide lubricant spray into the lubricant chamber.

10. An electric drive according to claim 1, wherein a clutch is provided in the power path between the electric motor and the at least one output shaft and that is configured to selectively effect and interrupt transmission of torque between the electric motor and the at least one output shaft.

11. An electric drive according to claim 10, wherein the clutch is operable by a controllable actuator, wherein the actuator comprises an electro-magnet that is connected to the intermediate wall of the housing assembly, wherein a portion of the magnetic housing and a portion of the intermediate wall form the lubricant chamber.

12. An electric drive according to claim 1, wherein the at least one output shaft comprises a second end portion remote from the transmission unit that is supported in a bearing receiving part of the housing assembly by a shaft bearing so as to be rotatable around the rotational axis, with the hollow motor shaft axially extending into the bearing receiving part.

13. An electric drive according to claim 12, wherein the hollow motor shaft is sealed by a rotational seal relative to the bearing receiving part, wherein the second opening of the annular channel is axially arranged between the rotational seal and the shaft bearing.

14. An electric drive according to claim 1, wherein the housing assembly comprises a cover part that is arranged between a first housing portion in which the electric motor is received and a second housing portion in which the transmission unit is received,
wherein the cover part comprises a bearing receiving portion,
wherein the hollow motor shaft comprises a shaft portion connected to the rotor of the electric motor, a bearing portion rotatably supported in the bearing receiving portion and the drive gear,
wherein the drive gear freely extends into a chamber between the cover part and the intermediate wall.

* * * * *